United States Patent [19]
Pris et al.

[11] 4,258,660
[45] Mar. 31, 1981

[54] ANIMAL LITTER COMPOSITION

[75] Inventors: Harold C. Pris, LaMoure, N. Dak.; Leo Froelich, 101 Kenwood Ct., Thief River Falls, Minn. 56701

[73] Assignee: Leo Froelich, Thief River Falls, Minn.

[21] Appl. No.: 92,532

[22] Filed: Nov. 8, 1979

[51] Int. Cl.³ .............................................. A01K 29/00
[52] U.S. Cl. ....................................................... 119/1
[58] Field of Search ............................................ 119/1

[56] References Cited

U.S. PATENT DOCUMENTS

| | | | |
|---|---|---|---|
| 3,217,692 | 11/1965 | Hay | 119/1 |
| 3,789,797 | 2/1974 | Brewer | 119/1 |
| 3,983,842 | 10/1976 | Marion et al. | 119/1 |

*Primary Examiner*—Gene Mancene
*Assistant Examiner*—Robert P. Swiatek
*Attorney, Agent, or Firm*—Kalish & Gilster

[57] ABSTRACT

An animal litter composition in pelletized form comprising straw as the major ingredient, sunflower hulls and dried alfalfa as minor constituents, and with a suitable binder.

8 Claims, No Drawings

ANIMAL LITTER COMPOSITION

BACKGROUND AND SUMMARY OF THE INVENTION

This invention relates to an improved composition for use as an animal litter.

Innumerable efforts have been made to develop an improved, highly efficacious litter for animals, particularly domestic pets, such as cats. In view of such efforts and experience achieved thereby, it is recognized that the long sought, desired litter must possess certain fundamental characteristics and properties, including by way of example only, a high-water or moisture absorbency; a capacity substantially for eliminating odors, particularly ammoniacal, as normally resulting from animal waste; a lack of toxicity so as to present no health hazard to the animals; a particulate weight and size to resist adhering to the animal for subsequent tracking about the surrounding area; an adequate crush strength to avoid being pulverized by the animal's bodily movements; a low degree of dusting; and being formed of economically available constituents.

To the present time the various, numerous preparations which have been developed in an effort to attain the foregoing properties have consistently been deficient in one or more respects.

Although various clays have been used for animal litters, such as fuller's earth, diatomaceous earth, and the like, high-water absorbency has been offset by an inherent incapacity to absorb odors. Litters consisting solely of a dehydrated grass, such as alfalfa, have also been utilized, as shown in U.S. Pat. No. 3,286,691, but such proved to be relatively expensive so that attempts have been made to use alfalfa in combination with other materials but with the alfalfa remaining the primary ingredient. One particular example of such is a litter wherein alfalfa is intermixed with a lightweight absorptive agent, such as vermiculite or perlite, as disclosed in U.S. Pat. No. 3,425,397. In this case the vermiculite and perlite being of lightweight tended to adhere to the animal with potential for tracking.

Other efforts have comprehended use of acidic cellulosic material, such as corncob grits, wherein the pH had to be properly controlled to avoid harm to the skin of the animals, as well as to provide the capacity to neutralize the basic character of the excretory matter of the animal, all as more fully set forth in U.S. Pat. No. 3,059,615. Although the foregoing is not to be construed as a complete review of animal litter compositions, such should be considered as indicating the generally basic type of such compositions currently known. From such a review it is evident that the goal of providing a litter possessing the aforementioned characteristics has not been heretofore achieved.

Therefore, it is an object of the present invention to provide an animal litter composition which comprises naturally occuring components which in predetermined combination provide synergistically, a litter possessing the long desired and recognized attribute of a proper and wholly effective litter.

It is another object of the present invention to provide an animal litter composition which does not require utilization of chemical agents in the preparation thereof and which permits the integration of various naturally occurring constituents into a pellet formed economically be readily available equipment.

It is another object of the present invention to provide an animal litter of the character stated which possesses moisture absorbency to a substantially greater extent than currently available litters, such as particularly those composed essentially of clay or alfalfa, which have been believed heretofore to possess a desired level of moisture absorptivity.

It is a further object of the present invention to provide an animal litter of the character stated which is comprised of components easily obtainable at a minimum cost.

It is a still further object of the present invention to provide an animal litter of the character stated which is highly efficient and reliable in use for waste control and odor elimination, as well as being non-toxic, readily disposable, and resistant to crushing.

DESCRIPTION OF THE INVENTION

In essence, this invention resides in the provision of an animal litter composition with its major component being constituted of a grain or gross straw, and including, as minor components, sunflower hulls, alfalfa, and a naturally occurring binder, such as bentonite or the like; the said components being ground and then pelletized into a pellet of predetermined size. The union of such components produces a litter having an inclusive range of those characteristics found to be of choice for litters.

In order to prepare a litter in accordance with the present invention, grain or grass straw, as of flax, rye, barley, oats, wheat, durm, triticle, rice hulls, and the like, is ground, as by subjection to a hammermill, for reduction to a particulate size preferably for passing a No. 5 or 5/64" screen. To the ground straw there is then added ground sunflower hulls which have been comminuted to a comparable particle size, as, for example, for passing through a 5/64" screen. The present composition also contains alfalfa which has been sun cured, that is, dried, under atmospheric conditions, and which is then ground to a particle size similar to that of the sunflower hulls and straw. Although it has been indicated that the foregoing ingredients have been suitably pulverized for passing a 5/64" screen, it is to be observed that such is merely a preferred size since the particles of these components may be within the range of 3/64 to ⅜", with equal effectiveness. A limited quantity of a binder, consisting of inert matter, such as clay, with bentonite being the preferred agent, is then provided for integration within the composition. Any clay, such as fuller's earth or the like could be utilized, as well as corn starch and lignin sulfonate, in lieu of the bentonite.

The foregoing components are then intermixed for effecting an even distribution throughout the batch being formed. Such intermixture is accomplished under ambient or room conditions and with the same being brought about by any suitable agitating equipment. Such batch is then pelletized in conventional manner into pellets, preferably having a diameter of 3/16" and a length of ⅜" to ½". The diameter may approximate ¼" but such dimensions are intended to provide a unit having suitable weight and size for resisting fracturing under bodily movements or the weight of the animal, as well as to be resistant to adherence to the animal causing removal from the litter and tracking throughout the surrounding area. After pelletization the pellets are permitted to cool to exhaust any excess moisture.

The efficiency of the litter composition of the present invention (to accomplish the various aims outlined above) has been established through comparative testing. Such testing has demonstrated the same to possess a greater moisture absorbency capacity then in litters known hereto. By absorbency tests it has been proved that the present invention in one minute can absorb over four times its weight in moisture. Such far outstrips litters composed primarily of clay which had been considered as having the greatest potential for moisture absorption; with clay-type litters having an absorbency of scarcely 2 to 1 for a 1 minute period. In lesser periods, as in the order of 15 seconds and 30 seconds, the differential was also shown to be most substantial, with the clay litters revealing a relatively constant 1.9 to 1 ratio as compared to a 2.7 and 3.8 to 1 ratio, respectively, for the present invention. With respect to litters having alfalfa as the sole or major ingredient, the differential between such and the present invention was, after 5 seconds almost 3 to 1; after 15 seconds almost 4 to 1; and from 30 seconds to 2 minutes between $2\frac{1}{2}$ and $3\frac{1}{2}$ to 1. As compared to other types of litters, such as those wherein the primary constituent was peanut hulls or corn cobs, the differentials were remarkedly greater than with those fundamentally or entirely of either clay or alfalfa.

The unique combination of ingredients in the present invention has endowed the same with this unique capacity for water absorptivity which far exceeds that of previous developments.

The present litter has a remarkable propensity for controlling odors since, as in use, objectionable odors are not detectable even in the immediate vicinity of the actual place of deposition of the litter. The relatively large pellet size conduces to facile removal of fecal matter without litter wastage. Furthermore, the present litter, being formulated of naturally occurring components, and being devoid of chemical treatment or chemical inclusion, is entirely non-toxic, so that no hazard is presented to the health and well-being of the animals. The litter of the present invention has an extremely low, as in non-existent, degree of dusting. Even when the litter disintegrates as a result of fluid saturation, the same merely reduces to a coarse, non-dusty powder, which may be dealt with conveniently. Additionally, the present litter possesses an unusual property of being biodegradable, and after its customary period of use, the same can be readily disposed of, as by distribution upon a lawn or throughout a garden, or even flushed down a drain without fear of clogging of the pipes.

It will thus be seen that the unusual combination of the ingredients of the present litter are synergistically productive of properties which one would not expect to be attainable through the particular combination, and, especially in view of the extensive prior work in this field.

The basic formulation of the present invention is as follows:

| | BY WEIGHT |
|---|---|
| STRAW, GRAIN OR GRASS, OR ANY COMBINATION THEREOF | Approx. 31% to 65% |
| SUNFLOWER HULLS | Approx. 10% to 35% |
| DRIED ALFALFA | Approx. 10% to 30% |
| BINDER: Clay, such as Bentonite, and fuller's earth, as well as corn starch and lignin sulfonate | Approx. 2.5% to 4% |

From the foregoing it will be seen that the primary ingredient is the grain or grass straw or combinations thereof and which component is admittedly inexpensive so as to promote economy in production. It is quite evident that the binder such as bentonite, fuller's earth or the like is in such minute quantity that the same does not contribute, as by its inherent moisture absorptivity, to the overall beneficial characteristics of the litter, but serves solely to provide the maintenance of the ingredients in pelletized form. Similarly, alfalfa is provided within a range which at maximum is substantially below $\frac{1}{2}$ by weight of the litter so that it is quite clear that the present invention is not a typically alfalfa type litter and does not rely upon the alfalfa alone to endow the litter with the capabilities outlined above.

The combination of the remaining components within the respective ranges, together with the minority of the alfalfa, brings about a potentiation vividly in excess of that achieved by the typical current alfalfa litter.

It is accordingly most evident that the unique combination of components of the present litter in some way not fully determined synergistically interrelate to produce the full scope of desired properties in a litter and to a very developed degree, recognizedly exceeding those known to the present time.

Having described our invention, what we claim and desire to obtain by Letters Patent is:

1. An animal litter composition consisting essentially of straw, sunflower hulls, dried alfalfa, and a binder such as clay, said straw being from the class consisting of grain and grass straws including flax, rye, barley, oats, wheat, durm, triticle, and rice hulls, said dried alfalfa consisting of between approximately 10-30% by weight of the litter.

2. An animal litter composition as defined in claim 1 and further characterized by the straw constituting approximately 31% to 65% by weight of the composition.

3. An animal litter composition as defined in claim 2 and further characterized by said sunflower hulls constituting between approximately 10% to 35% by weight of the litter.

4. An animal litter composition as defined in claim 3 and further characterized by the binder constituting between approximately 2.5% to 4% by weight of the litter.

5. An animal litter composition consisting essentially of straw from the class consisting of flax, rye, barley, oats, wheat, durm, triticle, and rice hulls and constituting between 25% to 65% by weight of the litter, sunflower hulls constituting between approximately 10% to 35% by weight of the litter, dried alfalfa constituting between approximately 10% and 30% by weight of the litter and a binder from the class consisting of bentonite, fuller's earth, corn starch, and lignin sulfonite and constituting between approximately 2.5% to 4% by weight of the litter.

6. An animal litter composition as defined in claim 5 and further characterized by the same being in pellet form, said pellets having a diameter within the range of 3/16 to $\frac{1}{4}$" and a length of $\frac{3}{8}$ to $\frac{1}{2}$".

7. An animal litter composition as defined in claim 6 wherein the said components of the litter are in ground, particulate character within the range of 3/64 to $\frac{3}{8}$".

8. An animal litter composition as defined in claim 7 wherein the said alfalfa is sun cured.

* * * * *